United States Patent [19]

Parthemore

[11] B 3,999,048

[45] Dec. 21, 1976

[54] FLOW CONTROL SYSTEM FOR THE PRECIPITATION OF SILVER HALIDE EMULSIONS

[75] Inventor: Keith Gordon Parthemore, Wilmington, Del.

[73] Assignee: E. I. Du Pont de Nemours and Company, Wilmington, Del.

[22] Filed: Sept. 9, 1974

[21] Appl. No.: 504,156

[44] Published under the second Trial Voluntary Protest Program on March 23, 1976 as document No. B 504,156.

[52] U.S. Cl. .................... 235/151.12; 235/151.34; 23/253 A; 23/230 A; 23/253 R; 23/230 R

[51] Int. Cl.[2] .................. G01N 27/00; G06G 7/57; G06G 7/58

[58] Field of Search ................ 235/151.12, 151.34; 23/253 A, 230 A, 253 R, 230 R

[56] References Cited

UNITED STATES PATENTS

| | | | |
|---|---|---|---|
| 3,552,428 | 1/1971 | Pemberton | 235/151.34 X |
| 3,610,898 | 10/1971 | Yamamoto et al. | 235/151.34 |
| 3,700,865 | 10/1972 | Ley | 235/151.34 X |
| 3,739,636 | 6/1973 | Versaci et al. | 235/151.34 X |
| 3,772,915 | 11/1973 | Stamler | 235/151.34 X |
| 3,821,002 | 6/1974 | Culhane et al. | 23/230 A |
| 3,854,038 | 10/1974 | McKinley | 235/151.34 |

*Primary Examiner*—Edward J. Wise

[57] ABSTRACT

Apparatus for controlling the concentration of silver ions during the precipitation of a silver halide emulsion in a precipitation vessel. A pair of valve assemblies control the introduction respectively of a silver salt and a halide salt into the precipitation vessel, each in accordance with a preselected program. The actual silver ion concentration in the vessel is measured, linearized and the preselected program for the silver salt introduction modified in accordance with a desired or programmed silver ion concentration.

2 Claims, 4 Drawing Figures

FLOW CONTROL SYSTEM FOR THE PRECIPITATION OF SILVER HALIDE EMULSIONS

BACKGROUND OF THE INVENTION

1. Field of the Invention

The present invention relates to an apparatus for controlling the silver ion concentration in the precipitation of a silver halide emulsion. More particularly, the invention relates to a linearizing circuit in a control loop in the apparatus. 2. Description of the Prior Art In the precipitation stage of a silver halide emulsion it is crucial that accurate control of the flow rate of the silver salt and halide salt solutions be maintained. Accurate control of the rate of addition of the solutions is required during precipitation especially at the early stages, as variations in the rates of delivery may have adverse effects upon the number of nuclei formed and therefore the final grain size of the emulsion produced. Control systems utilizing a programmer for programming the rates of addition of an aqueous silver salt and an aqueous halide salt solution in the precipitation of a silver halide emulsion, a sensor for sensing and producing a signal representative of the silver ion concentration in the precipitation vessel, a set point generator for producing a set point signal to produce an error signal for use in correcting an unbalance of silver and halide in the emulsion are known in the art. It is further known to linearize the output of a sensor measuring fluid flow in a conduit. However, nothing in the prior art relating to control loop circuits and sensors immersed in a silver halide precipitation vessel solves the problem of non linear sensor output due to the non linear characteristics of the measured variable silver ion concentration in the precipitation process which results in unwanted over or under corrections by the controller. What is needed is improved apparatus for controlling the ratio of silver ions to halide ions in the emulsion in which such a non linearity is taken into consideration.

SUMMARY OF THE INVENTION

The apparatus includes a first valve assembly for introducing silver salt into the precipitation vessel, a second valve assembly for introducing a halide salt into the precipitation vessel, a flow programmer for generating a time varying flow control signal for controlling said second valve assembly, a set point programmer for generating a set point, a sensor in said precipitation vessel for generating a signal representative of silver ion concentration therein, linearizing means for linearizing the output of said sensor, comparator means coupled to said linearizing means and to said set point programmer for generating a first error signal, ratio means responsive to said flow control signal for modifying said flow control signal by a factor, and adder means responsive to said first error signal and to said modified flow control signal for providing a second flow control signal for controlling said first valve assembly.

DESCRIPTION OF THE PREFERRED EMBODIMENTS

Figure 1:
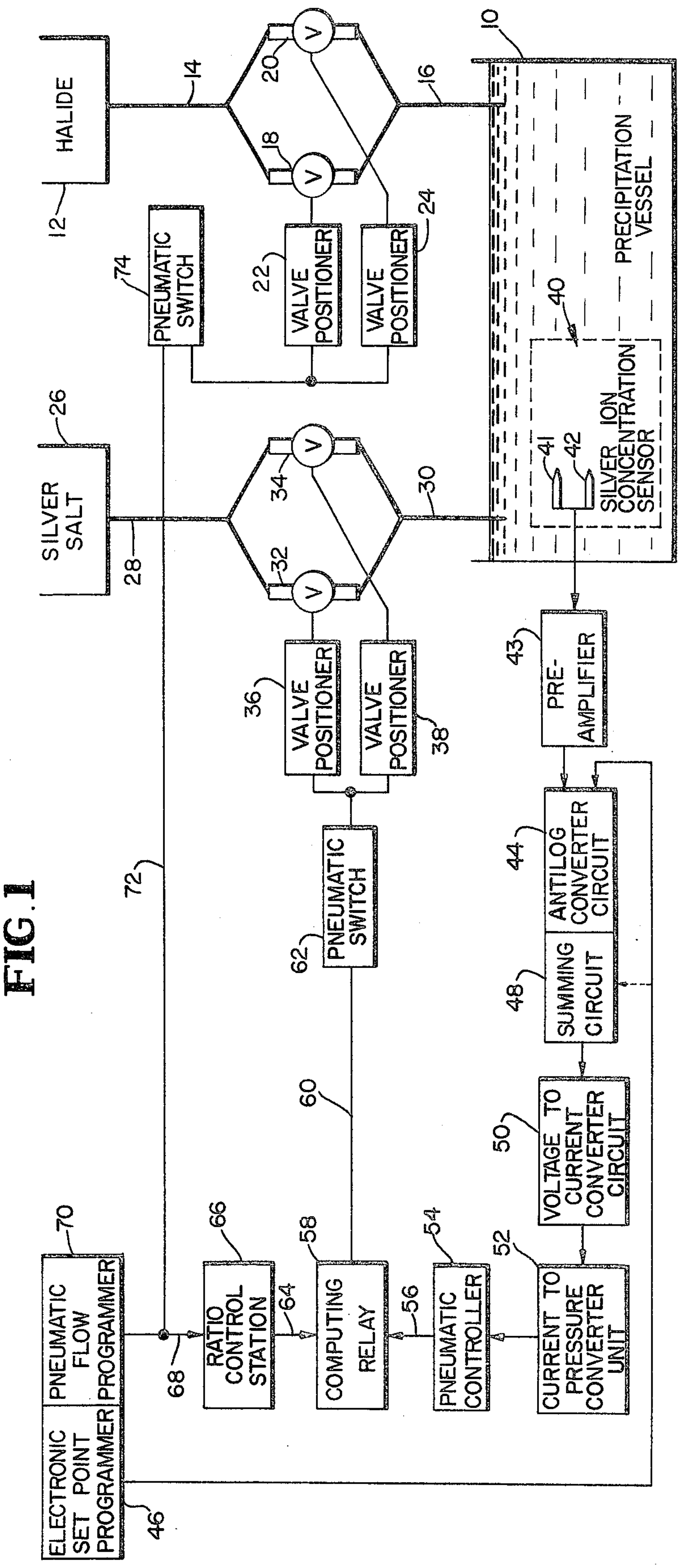
FIG. 1 is a partially schematic representation of a system for controlling the concentration of silver ions in the precipitation of a silver salt solution and a halide salt solution.

A system for controlling silver salt and halide salt additions during the precipitation stage in the preparation of a silver halide emulsion is outlined in FIG. 1. A precipitation vessel 10 receives an aqueous halide salt solution from a vessel 12 through conduits 14, 16 and plug valves 18, 20 which are ¼ and ½ Hastelloy "C" valves respectively, manufactured by Badger Meter Co., Precision Products Division. The valves are controlled by valve positioners 22 and 24 respectively, both of which are a model 73 NB manufactured by Moore Products Co.

A silver ion concentration sensor 40 is located in precipitation vessel 10. Sensor 40 is composed of a silver ion concentration measuring electrode 41, an Orion Model 94-35A, and a silver-silver chloride reference electrode 42. The output of sensor 40 is applied to preamplifier 43 which amplifies the output and passes it on to antilog converter circuit 44. A set point from electronic set point programmer 46 is also applied to antilog converter circuit 44. Both the amplified sensor output and the set point are linearized by antilog converter circuit 44 and passed to summing circuit 48, which is a standard operational amplifier. In an alternative embodiment the set point may be applied directly to summing circuit 48. The output of summing circuit 48 is an error signal which is applied to voltage to current converter circuit 50. The latter voltage to current converter circuit 50 passes on a current output to current to pressure converter unit 52 which produces a pneumatic signal related to the current signal and passes the pneumatic signal to pneumatic controller 54 which is a Moore Products Co. model 528C3M-2W. The pneumatic controller 54 produces a pneumatic output related to the error signal from summing circuit 48 and applies it through conduit 56 to computing relay 58 which is a Moore Products Co. model 68-1. The pneumatic output of computing relay 58 is then fed through conduit 60 to pneumatic switch 62 which switches the output of computing relay 58 to either valve positioner 36 or valve positioner 38, or both. Computing relay 58 receives another pneumatic input through conduit 64 from ratio control station 66 which is a Moore Products Co. model 544-21. Ratio control station 66 receives its pneumatic input through conduit 68 from pneumatic flow programmer 70 a Moore Products Co. model 575C-10. Ratio control station 66 generates an output signal which is in a specific ratio to the input pneumatic signal from pneumatic flow programmer 70. The pneumatic signal generated by pneumatic flow programmer 70 is also fed through conduit 72 to pneumatic switch 74 which switches the pneumatic signal to either valve positioner 22 or valve positioner 24, or both.

Figure 2:
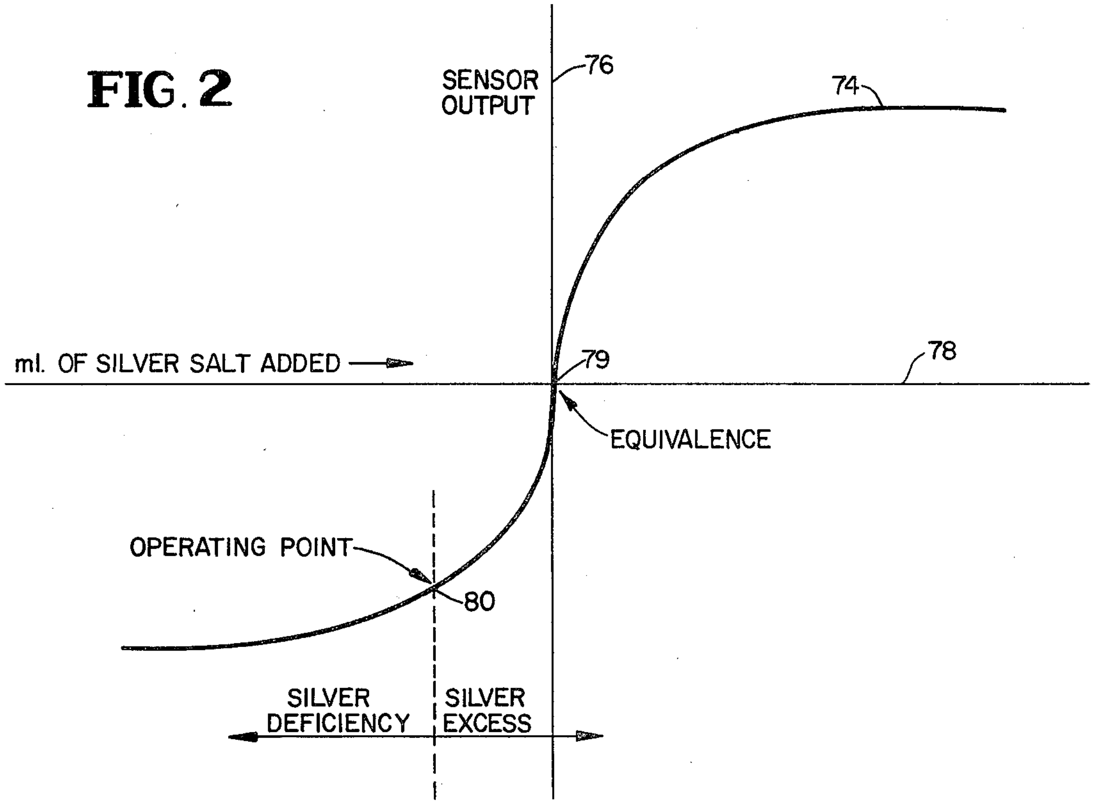
FIG. 2 is a diagrammatic view of a curve representing the response of a silver ion concentration sensor when a silver salt solution is added to a halide salt solution.

FIG. 2 describes a titration curve which shows the output of a sensor immersed in a halide salt solution as a constant molarity silver salt solution is added. The ordinate axis 76 is the sensor output in volts or millivolts and the abscissa 78 is the amount of silver salt solution added in milliliters. In the precipitation of a silver halide emulsion the silver ion concentration sensor 40, immersed in the precipitation vessel 10, generates a signal corresponding to a point on curve 74. Once the desired rates of flow of the silver salt and halide salt solution have been selected and established sensor 40 which measures the silver ion concentration in the precipitation vessel will generate a signal which is related to the rates of flow of the two solutions. This signal will correspond in an operating point 80 on curve 74. Any disturbance in the rate of flow of either solution will result in a change in the output of sensor 40 along curve 74. To the right of operating point 80 there is a silver excess which would indicate that halide needs to be added to return to the operating point. To the left of operating point 80 is a silver deficiency which indicates that more silver is needed to correct the unbalance. The equivalence point 79 indicates the point at which thc silver ion concentration is equal to the halide concentration.

Figure 3:
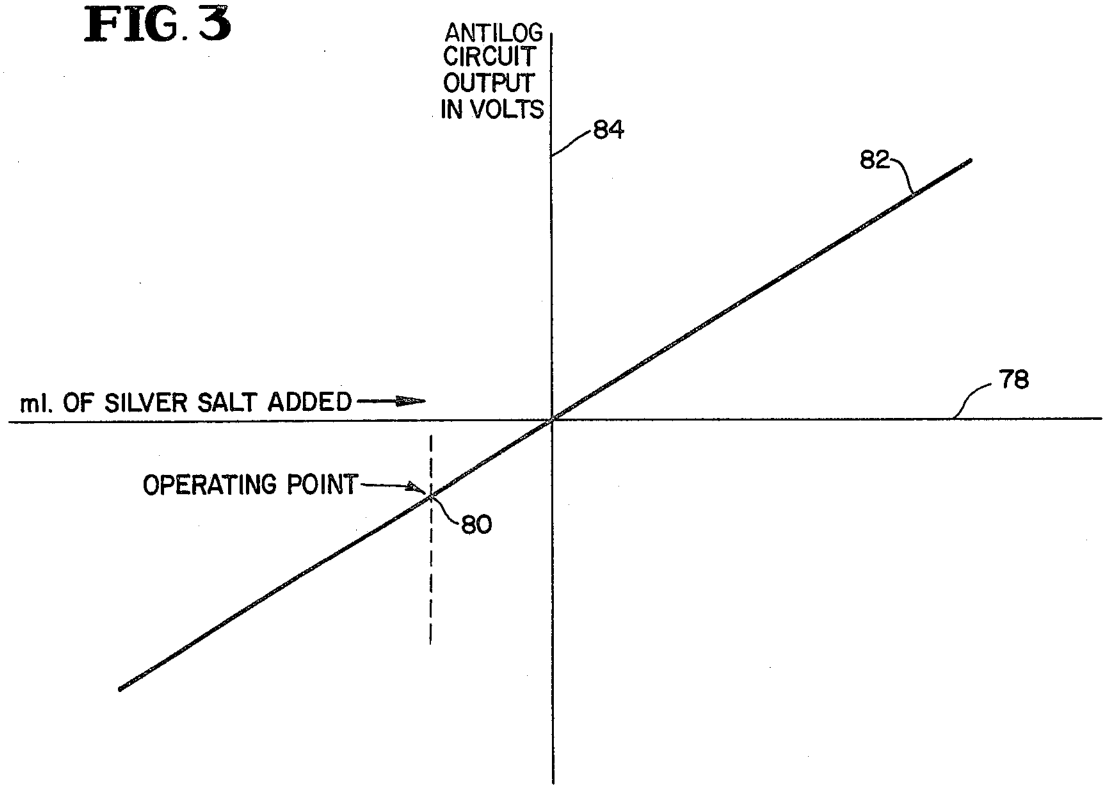
FIG. 3 is a diagrammatic view of the curve of FIG. 2 after it has been linearized.

FIG. 3 shows a curve 82 which represents curve 74 of FIG. 2 after it has been linearized by antilog converter circuit 44 shown in FIG. 1. The ordinate axis 84 is the output of antilog circuit 44 in volts or millivolts. The abscissa 78 and operating point 80 are the same as in FIG. 2.

Figure 4:
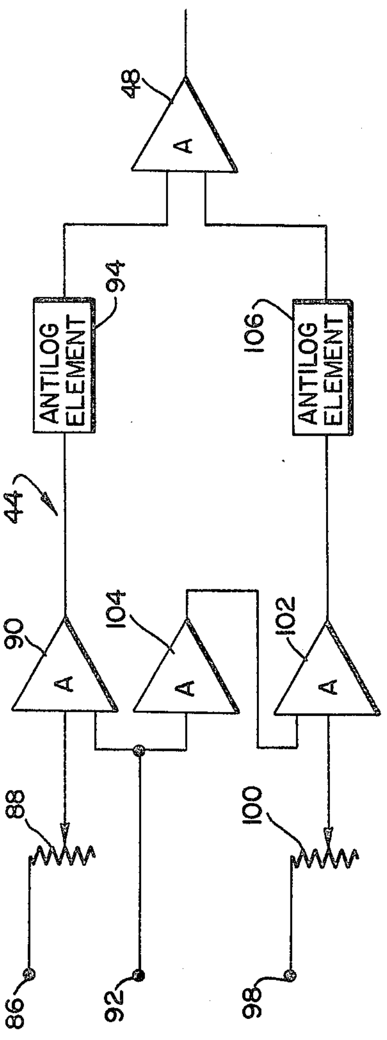
FIG. 4 is a partially schematic view of apparatus for linearizing the curve of FIG. 2.

FIG. 4 shows the details of antilog circuit 44 of FIG. 1. A terminal 86 receives the output of preamplifier 43 of FIG. 1. Terminal 86 is connected through a scaling potentiometer 88 to a summing amplifier 90. The latter summing amplifier 90 also receives a bias voltage input from terminal 92. The output of summing amplifier 90 is connected to antilog element 94 which is a Philbrick Model 4351. Antilog element 94 computes the negative antilog (a negatively increasing exponential) of an input voltage thus providing an antilogarithmic response to linearize the amplified response of sensor 40. The output of antilog element 94 is connected to summing amplifier 48. The output of the electronic set point programmer 46 is applied to terminal 98 which is connected through scaling potentiometer 100 to summing amplifier 102. Another input is fed to summing amplifier 102 from the inverting amplifier 104 which receives its input from bias voltage terminal 92. The output of summing amplifier 102 is connected to antilog element 106 which is a Philbrick Model 4350. Antilog element 106 computes the positive antilog (a positively increasing exponential) of an input voltage thus providing an antilogarithmic response to linearize the set point. The output of antilog element 106 is connected to amplifier 48 where the linearized set point and the linearized signal from sensor 40 are summed to produce an error signal.

In operation to produce the silver halide emulsion, halide is added to precipitation vessel 10 as shown in FIG. 1, through ¼ inch valve 18 which regulates the halide flow. Valve 18 is controlled by valve positioner 22 which receives pneumatic signals from pneumatic flow programmer 70. The pneumatic signals are directed to valve 18 through pneumatic switch 74. The flow is directed through valve 18 at the initial stages of addition of the halide salt solution. Valve 18 is a ¼ inch plug valve which has been precisely calibrated over small flow rates so that together with the ratio control station 66 and also precisely calibrated ¼ inch plug valve 32 the initial flow of the two solutions into the precipitation vessel is for all practical purposes perfectly balanced. Thus no need for flow correction appears at the early precipitation stages and the feedback control system action is negligible. This was corrective excursions at this critical stage are avoided. As the rate of flow of the two solutions increases, the initial low level is no longer adequate to maintain balanced flow calibration and the feedback control loop becomes increasingly important. Pneumatic flow programmer 70 generates a pneumatic signal according to a preselected program to control the flow of halide.

Simultaneously with the addition of halide, silver salt is added to precipitation vessel 10 through ¼ inch valve 32 which regulates the flow of silver salt. Valve 32 is controlled by valve positioner 36 which receives a pneumatic signal from pneumatic flow programmer 70 through ratio control station 66, computing relay 58, and pneumatic switch 62. The ratio controller 66 adjusts the pneumatic signal to a preselected ratio with the signal supplied to valve positioner 22 to allow silver salt and halide to be added to precipitation vessel 10 in precise balance. As explained above, silver salt flow is initially directed through a ¼ inch valve 32.

Sensor 40, immersed in the precipitation vessel 10, generates an analog output signal in millivolts which indicates the silver ion concentration in the vessel. The sensor output determines where along curve 74 the actual silver ion concentration lies. This allows for any deviation between operating point 90 and the actual silver ion concentration to be determined, so that the silver ion concentration may be adjusted back to the operating point by appropriate addition of silver salt. One of the problems with this adjustment is that the output sensor 40 (i.e., curve 74) is non linear due to non linearities in the properties of the sensor and the process as discussed previously. This means there is a non linear relationship between the addition of silver salt and the deviation from the operating point. It is desirable to linearize the output of sensor 40 such that a linear relationship exists between additions of silver salt and the deviation from the operating point.

To achieve linearization of the output of sensor 40 the latter output is applied to preamplifier 43 to be amplified and then into antilog converter circuit 44 where linearization occurs. In antilog converter circuit 44 the amplified sensor signal has its amplitude adjusted by scaling potentiometer 88 and then goes through a summing amplifier 90 where the signal is summed with a bias voltage from terminal 92. The output of amplifier 90 then goes to antilog element 94. The latter antilog element 94 has a response which linearizes the portion of curve 74 which lies below equivalence point 79. The linearized curve is shown in FIG. 3 as the portion of curve 82 below equivalence point 79. The linearized signal is then applied to summing amplifier 48 where the signal is to be compared with the set point from electronic set point programmer 46. If the system were to be operated with an operating point above equivalence point 79 then the output of amplifier 90 would be switched (switch not shown) to antilog element 106. The latter antilog element 106 has a response which linearizes the portion of curve 74 above equivalence point 79. The linearized curve is shown in FIG. 3 as the portion of curve 82 about equivalence point 79.

The set point is linearized before it is applied to summing amplifier 48. This is done because system operators are accustomed to adjusting the chemical balance of silver halide emulsions in terms of sensor output in millivolts and wish to enter the set point into the electronic set point programmer in terms of sensor output in millivolts. Since the sensor output in millivolts is non linear, then the set point is also non linear.

The set point has its amplitude adjusted by scaling potentiometer 100 and then goes through the summing amplifier 90 where a bias voltage coming from terminal 92 and inverting amplifier 104 is summed with the set point. The output of amplifier 102 is then applied to antilog element 106 which linearizes the set point and passes it on to the inverting input of summing amplifier 48. The use of antilog element 106 to linearize the set point enables the system to use only 2 antilog elements. While one antilog element is linearizing the sensor 40 output, the other antilog element is linearizing the set point. If the operating point of the system is above the equivalence point 79, then the sensor output and set point signal will be switched to opposite antilog elements.

Although it is preferred to linearize the set point signal, an operator could calculate a catalogue of linearized set point values for entry into electronic set point programmer 46 whose output could then be applied directly to summing circuit 48.

The error signal from summing circuit 48 is then applied to voltage to current converter circuit 52 where transformation to a current signal takes place. The latter current signal is then transformed to a pneumatic pressure signal in current to pressure converter unit 50. The pneumatic controller generates a pneumatic signal which includes proportional plus integral response. The pneumatic signal is then applied through conduit 56 to computing relay 58 where the latter pneumatic error signal and the pneumatic signal from the ratio control station 66 are summed. The addition of the pneumatic error signal from pneumatic controller 56 to the signal from ratio control station 66 allows the valve control 36 to adjust the flow of silver salt to bring the chemical balance of the silver ions and halide ions back to the operating point as seen in FIG. 2. It should be noted that valve control 36 could also easily be used to control valve 22 and the halide flow to achieve the same correction.

The apparatus of the present invention allows for a high degree of accuracy in the control of the rates of delivery of silver salt and halide salt solution into the precipitation vessel thus minimizing variations in the delivery rates which may adversely affect the number of nuclei formed and the final grain size distribution and morphology of the emulsion produced which in turn affects the final light sensitivity.

I claim:

1. Apparatus for controlling the concentration of silver ions during precipitation of a silver halide in a precipitation vessel comprising, in combination:

a first valve assembly for introducing silver salt into said precipitation vessel, a second valve assembly for introducing a halide salt into said precipitation vessel, a flow programmer for generating a time varying flow control signal for controlling said second valve assembly, a set point programmer for generating a set point, a sensor in said precipitation vessel for generating an analog signal representative of silver ion concentration therein, linearizing means for linearizing said analog signal, comparator means coupled to said linearizing means and to said set point programmer for generating a first error signal, ratio means responsive to said flow control signal for modifying said flow control signal by a factor, and adder means responsive to said first error signal and to said modified flow control signal for providing a second flow control signal for controlling said first valve assembly.

2. Apparatus according to claim 1 wherein said linearizing means includes means for linearizing the output of said set point programmer.

* * * * *